(12) United States Patent
Yoneda

(10) Patent No.: US 6,301,083 B1
(45) Date of Patent: Oct. 9, 2001

(54) VIDEO TAPE RECORDER

(75) Inventor: Haruhiko Yoneda, Daito (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/408,326

(22) Filed: Sep. 29, 1999

(30) Foreign Application Priority Data

Oct. 5, 1998 (JP) .................................................. 10-282314

(51) Int. Cl.$^7$ .............................. G11B 5/56; G11B 21/24
(52) U.S. Cl. ........................................................... 360/291
(58) Field of Search .................................... 360/290, 291, 360/291.1, 291.2, 291.3, 241, 240, FOR 209

(56) References Cited

U.S. PATENT DOCUMENTS

| | | | | |
|---|---|---|---|---|
| 4,329,723 | * | 5/1982 | Schoenmakers | 360/291.2 |
| 5,479,307 | * | 12/1995 | Lee | 360/291.3 |
| 5,680,279 | * | 10/1997 | Lee | 360/291.3 |
| 5,703,737 | * | 12/1997 | Katohno et al. | 360/291.3 |

* cited by examiner

Primary Examiner—Robert S. Tupper
Assistant Examiner—Julie Anne Watko
(74) Attorney, Agent, or Firm—Hogan & Hartson, L.L.P.

(57) ABSTRACT

In a video tape recorder of the invention, a position adjusting mechanism for adjusting the X distance comprises a support plate 6 having a control head mounted thereon, a pivot pin 16 pivotally supporting an end of the support plate 6 on a chassis 1, a clamp piece 7 holding a portion 60 of the support plate 6 on the chassis 1 by clamping to give resistance to the pivotal movement of the support plate 6, and a screw 91 engaging another end of the support plate 6 with play for permitting the pivotal movement of the support plate 6 and fixing the end to the chassis 1 at an optional position within the range of the play. The clamp piece 7 comprises a receiving portion 71 for receiving the rear surface of the portion 60 of the support plate 6 and a holding portion 72 for holding the front surface of the support plate portion 60 under pressure. The portion 60 of the support plate 6 is inserted between the receiving portion 71 and the holding portion 72 by a press fit.

3 Claims, 7 Drawing Sheets

VIDEO TAPE RECORDER

FIELD OF THE INVENTION

The present invention relates to video tape recorders wherein a magnetic tape is wound around a rotary head cylinder to record signals on the tape or reproduce signals from the tape, and more particularly to video tape recorders (VTRs) wherein the distance of travel of the magnetic tape from the head cylinder to a control head is adjustable with high precision.

BACKGROUND OF THE INVENTION

With reference to FIG. 14, VTRs comprise a rotary head cylinder 2 mounted in a predetermined inclined posture on a chassis 1, and a pair leading guide posts 4, 41 arranged at opposite sides of the cylinder 2 and reciprocatingly movable along respective guide grooves 11, 12. A magnetic tape 10 is withdrawn from a tape cassette (not shown) and wound around the cylinder 2 by the advance of the guide posts 4, 41 to provide a specified path of travel of the tape.

A supply reel support 3 and a take-up reel support 31 are arranged on the chassis 1. Also arranged on the chassis 1 along the path of travel of the tape are a fixed guide post 42, back tension post 43, fixed guide post 44, full-width erasing head 21, sound erasing head 22, sound/control head 23, fixed guide post 45, capstan 46, pinch roller 47 and withdrawing guide post 48. The capstan 46, when driven, moves the tape 10 in one direction for recording or reproduction of signals.

As shown in FIG. 11, the sound erasing head 22 and the sound/control head 23 are mounted on a base plate 51, collectively providing a magnetic head assembly 5. The assembly 5 is supported by three post members 52, 52, 52 on a support table 9.

Referring to FIGS. 11 and 12, the support table 9 is supported by a pivot 16 projecting from the chassis 1 and by bosses 14, 15 provided on the chassis 1. Two screws 91, 92 extending through the support table 9 are screwed in the respective bosses 14, 15. The support table 9 are secured to the chassis 1 by tightening up these screws 91, 92.

The magnetic tape 10 for use in the VTR described is formed with a track pattern, on which the distance from the final end of B head recording track to the position where a control signal for the track is recorded (hereinafter referred to as the "X distance") must be set at a predetermined value.

As shown in FIG. 13, the support table 9 has two holes 93, 94 for inserting the two screws 91, 92 therethrough. The holes 93, 94 are each elongated along a circular arc centered about a hole 90 for inserting the pivot 16 therethrough. To adjust the X distance, the position of the sound/control head 23 is variable by moving the support table 9 about the pivot 16 as indicated by arrows in FIG. 11.

In the step of assembling the VTR, the X distance is adjusted by loosening the two screws 91, 92 to such an extent as to give some fastening force (prefastening force) to the support table 9, then moving the support table 9 about the pivot 16 to a position where the predetermined X distance is realized, and tightening up the two screws 91, 92 to fix the support table 9 in this position.

With the fastening mechanism wherein the screws 91, 92 are used, the fastening force varies greatly with a slight difference in the state of the screws 91, 92 as tightened. If the prefastening force of the two screws 91, 92 is excessive, a great force is required to move the support table 9, presenting difficulty in adjusting the X distance. If the prefastening force of the screws 91, 92 is conversely too small, the support table 9 will shift during the adjustment of the X distance or when the screws 91, 92 are tightened up after the distance adjustment, giving rise to the problem of producing an error in the X distance. There is another problem that the adjustment takes much time since each of the two screws 92, 92 needs tightening in two steps.

SUMMARY OF THE INVENTION

An object of the present invention is to provide a video tape recorder wherein the X distance is adjustable accurately with greater ease and within shorter period of time than in the prior art.

The present invention provides a video tape recorder wherein a position adjusting mechanism for supporting a control head on a chassis 1 comprises a support plate 6 having the control head mounted thereon, a pivotal support mechanism pivotally supporting a first end of the support plate 6 on the chassis 1 so as to move the control head plate 6 toward or away from a rotary head cylinder, a clamp mechanism holding a second end of the support plate 6 on the chassis 1 by clamping to give resistance to the pivotal movement of the support plate 6 about the pivotal support mechanism, and a fastening mechanism engaging a third end of the support plate 6 with play for permitting the movement of the support plate 6 about the pivotal support mechanism and fixing the third end to the chassis 1 at an optional position within the range of the play to prevent the movement of the support plate 6.

To adjust the X distance, a force for turning the support plate 6 about the pivotal support mechanism is applied to the support plate 6, with the fastening mechanism loosened. The support plate 6 has its second end held by the clamp mechanism with a suitable definite clamping pressure and is pivotally movable within the range of play of the fastening mechanism, so that the support plate 6 is easily movable by the turning force, and the second end is shifted while being held clamped by the clamp mechanism. Accordingly, the support plate 6 is pivotally movable without necessitating a great force, and is further unlikely to move freely even with the fastening mechanism loosened.

After the adjustment of the X distance, the third end of the support plate 6 is fastened by the fastening mechanism to fix the support plate 1 to the chassis 1. At this time, the support plate 6 has its second end held by the clamp mechanism with a suitable clamping pressure and is thereby given resistance to pivotal movement and accordingly unlikely to shift from the adjusted position. Since the mechanism to be manipulated in adjusting the X distance is limited only to the fastening mechanism, the adjustment can be made with greater ease within a shorter period of time than in the conventional case wherein two fastening mechanisms (screws) need to be manipulated.

Stated more specifically, the clamp mechanism comprises a resin clamp piece 7 secured to the chassis 1, and the clamp piece 7 comprises a receiving portion 71 for receiving a rear surface of the second end of the support plate 6 and a holding portion 72 for holding a front surface of the second end of the support plate 6 under pressure, the second end of the support plate 6 being inserted between the receiving portion 71 and the holding portion 72 by a press fit. With this construction, the clamp piece 7 providing the clamp mechanism can be secured to the chassis 1 along with other members on the chassis 1 as by outsert molding. The present invention can therefore be practiced without entailing an increase in the number of fabrication steps.

According to another specific construction, the clamp mechanism is formed integrally with the chassis 1 and has a raised piece 82 holding with pressure a front surface of the second end of the support plate 6 received by a front surface of the chassis 1, and the second end of the support plate 6 is inserted between the surface of the chassis 1 and the raised piece 82 by a press fit. Since the raised piece 82 can be formed integrally with the chassis 1 to provide the clamp mechanism, the present invention can be practiced with a smaller number of components than conventionally.

Further stated specifically, the fastening mechanism comprises a screw 91 extending through an elongated hole 62 formed in the support plate 6 and screwed in a boss 14 on the chassis 1, and the support plate 6 is pivotally movable about the pivotal support mechanism within a range allowed by the elongated hole 62. After the X distance is adjusted with the screw 91 loosened, the support plate 6 can be fixed to the chassis 1 by tightening up the screw 91.

According to the present invention, the X distance is thus adjustable accurately with greater ease and within shorter period of time than in the prior art.

DETAILED DESCRIPTION OF EMBODIMENTS

Figure 14:
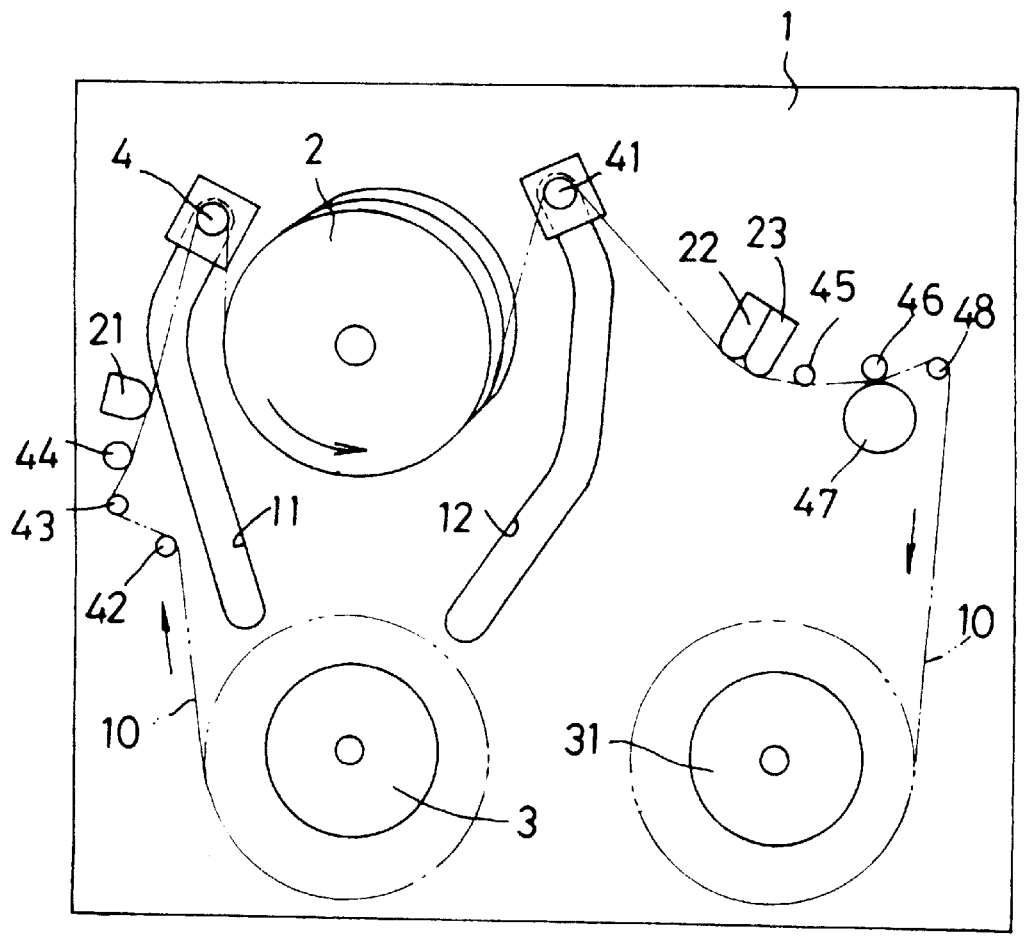
FIG. 14 is a plan view showing the main construction of a VTR.

With reference to the drawings, a detailed description will be given below of the present invention as embodied for the VTR shown in FIG. 14.

Figure 1:
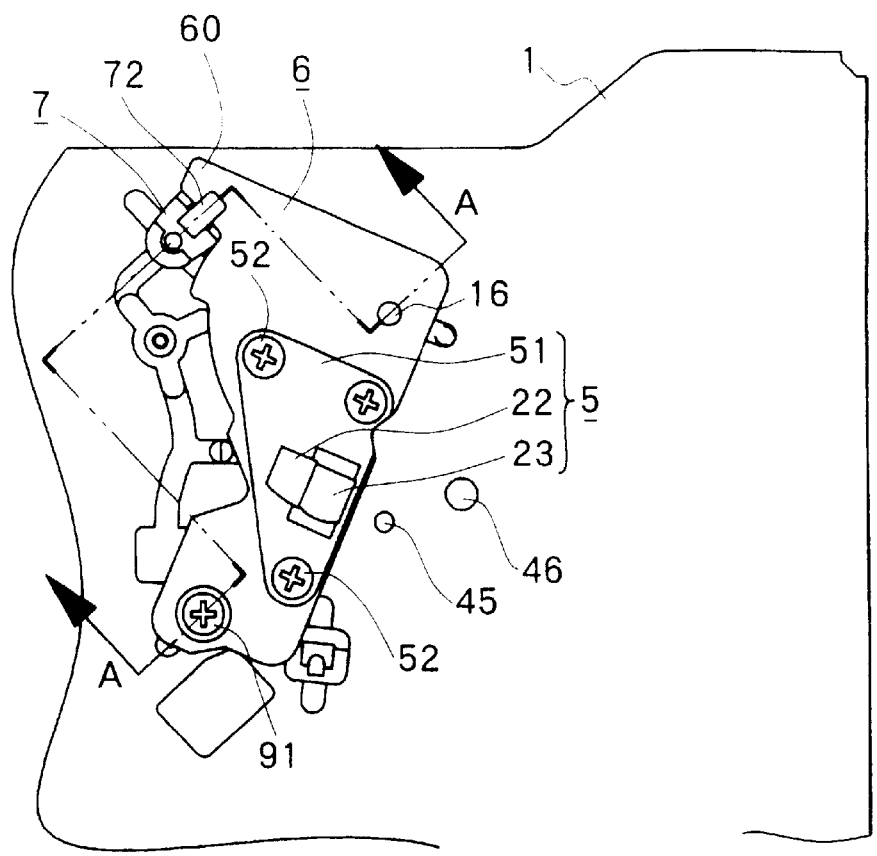
FIG. 1 is a plan view showing a mechanism for adjusting the position of the control head of a VTR embodying the invention.

As shown in FIG. 1, a sound erasing head 22 and a sound/control head 23 are mounted on a base plate 51, collectively providing a magnetic head assembly 5, which is supported on a chassis 1 by the position adjusting mechanism to be described below.

Figure 2:
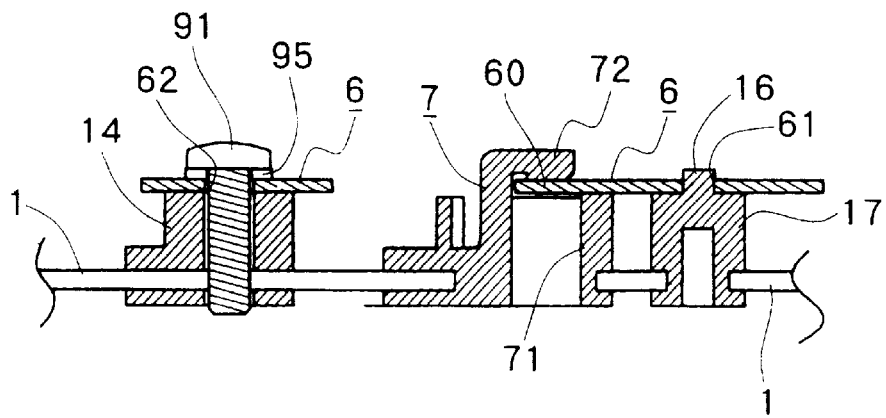
FIG. 2 is a view in section taken along the line A—A n FIG. 1.
Figure 3:
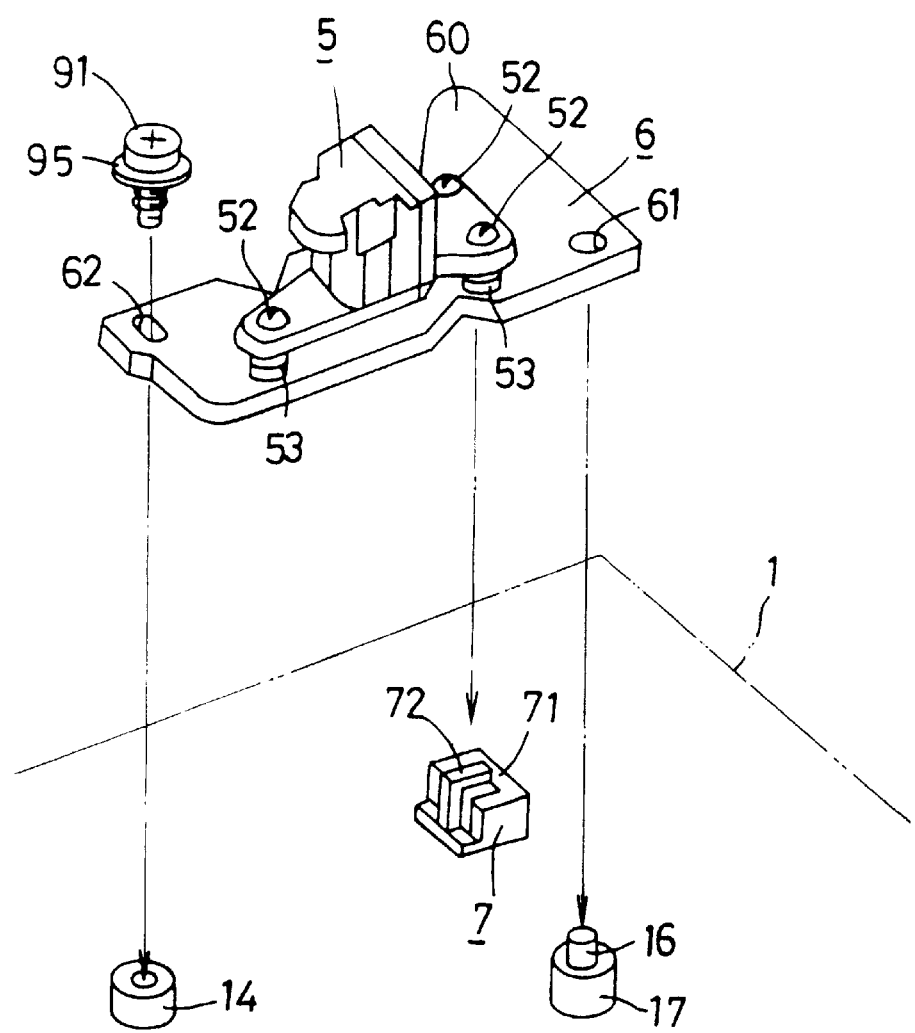
FIG. 3 is an exploded perspective view of the position adjusting mechanism.

Stated more specifically with reference to FIGS. 2 and 3, attached to the chassis 1 by outsert molding of a resin are a first boss 17 having a projecting pivot pin 16, a second boss 14 for a screw 91 to be screwed in, and a clamp piece 7 comprising a receiving portion 71 in the form of a cylinder of rectangular cross section and a hooklike holding portion 72. A support plate 6 having the magnetic head assembly 5 mounted thereon is supported at a predetermined level by the bosses 17, 14 and the clamp piece 7.

Figure 5:
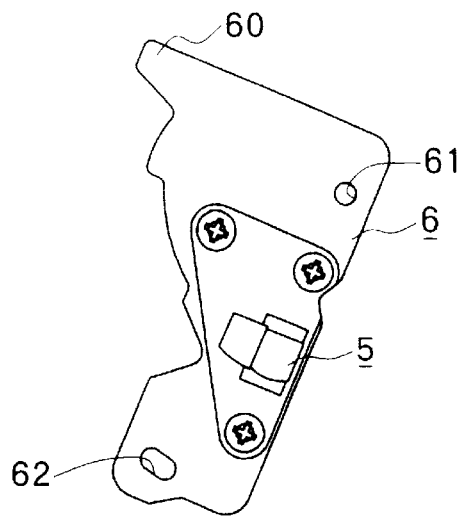
FIG. 5 is a plan view showing the support plate with a magnetic head assembly mounted thereon.
Figure 6:
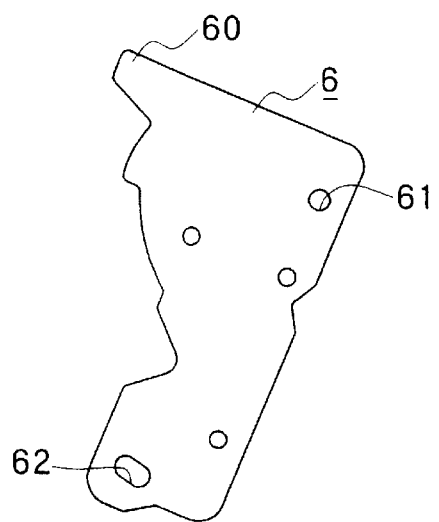
FIG. 6 is a plan view of the support plate with the magnetic head assembly removed therefrom.

As shown in FIGS. 5 and 6, the support plate 6 has three ends, i.e., first to third ends, projecting outward and positioned around the portion thereof to which the assembly 5 is attached. The first end is formed with a pinhole 61, and the second end provides the portion 60 to be clamped. The third end has a hole 62 elongated along a circular-arc line centered about the pinhole 61.

Figure 4:
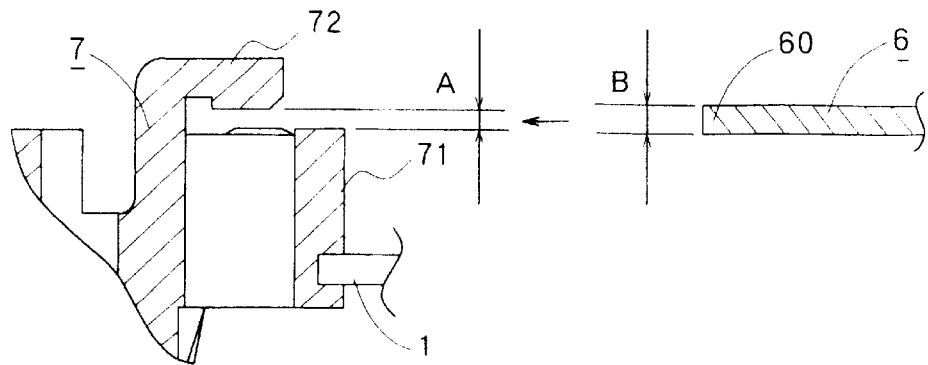
FIG. 4 is a view in section for illustrating the dimensional relationship between a clamp piece and a support plate.

With reference to FIG. 4, formed between the receiving portion 71 of the clamp piece 7 and the holding portion 72 thereof is a clearance A (e.g., 0.8 mm) slightly smaller than the thickness B (e.g., 1.0 mm) of the support plate 6. The portion 60 of the support plate 6 to be clamped is inserted into the clearance by a press fit, whereby the portion 60 is held to the clamp piece 7.

As shown in FIGS. 2 and 3, the pivot pin 16 projecting from the first boss 17 on the chassis 1 extends through the pinhole 61 in the support plate 6, and the screw 91 extends through a spring washer 95 and the elongated hole 62 of the support plate 6 and is screwed in the second boss 14.

As seen in FIG. 3, the magnetic head assembly 5 is supported by three post members 52, 52, 52 on the support plate 6. The support plate 6 is held raised by being biased by coil springs 53 fitting around the respective post members 52.

To adjust the X distance, a turning force acting about the pivot pin 16 is applied to the support plate 6, with the screw 91 loosened. This pivotally moves the support plate 6 within the range of play permitted by the elongated hole 62, consequently moving the magnetic head assembly 5 to alter the X distance.

Figure 7:
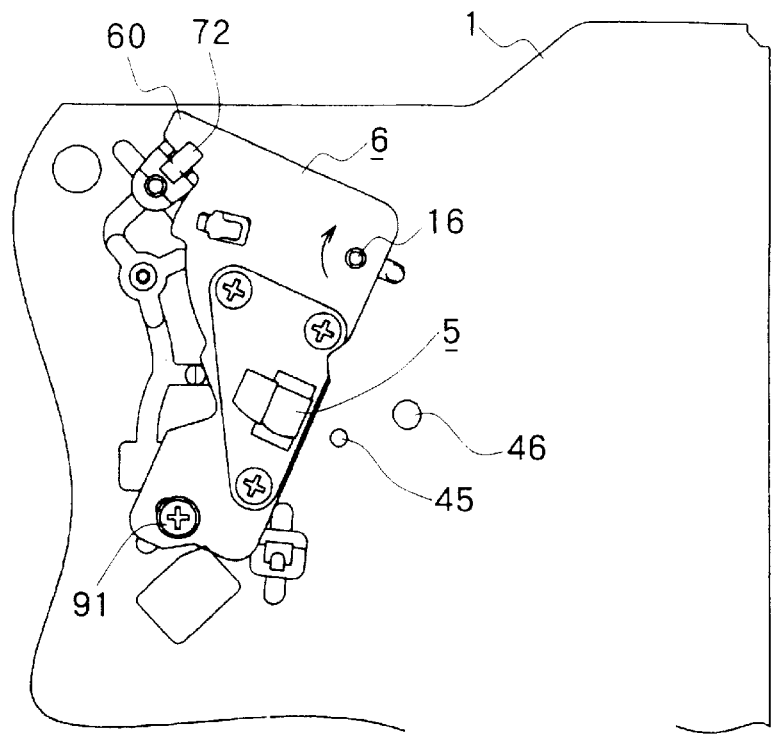
FIGS. 7(a) and 7(b) are plan views showing how to adjust the X distance.
Figure 7:
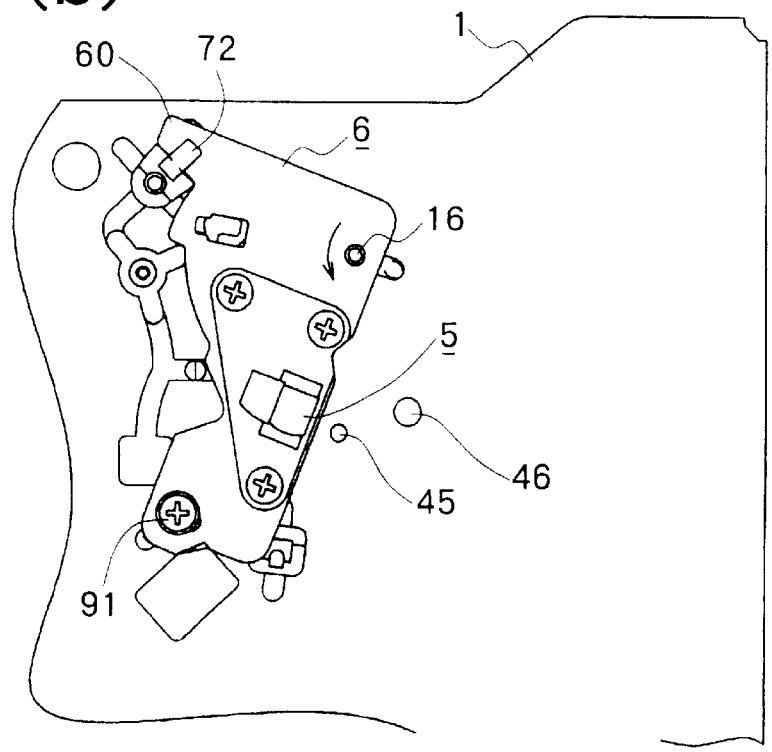

FIG. 7(a) shows the support plate 6 as moved clockwise to a limit position, whereby the X distance is set at a minimum value. On the other hand, FIG. 7(b) shows the support plate 6 as moved counterclockwise to a limit position, whereby the X distance is set at a maximum value. Accordingly, the X distance is adjustable by adjusting the angle of rotation of the support plate 6 between the two positions shown in FIGS. 7(a) and 7(b).

In the X distance adjusting procedure described, the receiving portion 71 and the holding portion 72 of the clamp piece 7 hold the portion 60 of the support plate 6 with a suitable clamping pressure, offering definite resistance to the movement of the support plate 6 and therefore ensuring exquisite adjustment without necessitating an excessive force for moving the support plate 6. The support plate 6 is unlikely to move freely from the adjusted position when the screw 91 is loosened.

After the adjustment of the X distance, the screw 91 is tightened up to fasten the support plate 6 to the chassis 1. With the second end of the support plate 6 held by the clamp piece 7 with a suitable definite pressure, there is no likelihood that the plate 6 will shift from the adjusted position as the screw 91 is tightened up.

The VTR of the present invention is so adapted that the X distance is adjustable by manipulating the single screw 91 unlike the conventional VTR necessitating the manipulation of two screws. The distance is therefore adjustable easily with high accuracy within a shortened period of time. Furthermore, a reduction in the number of parts (number of screws) leads to a cost reduction.

Figure 8:
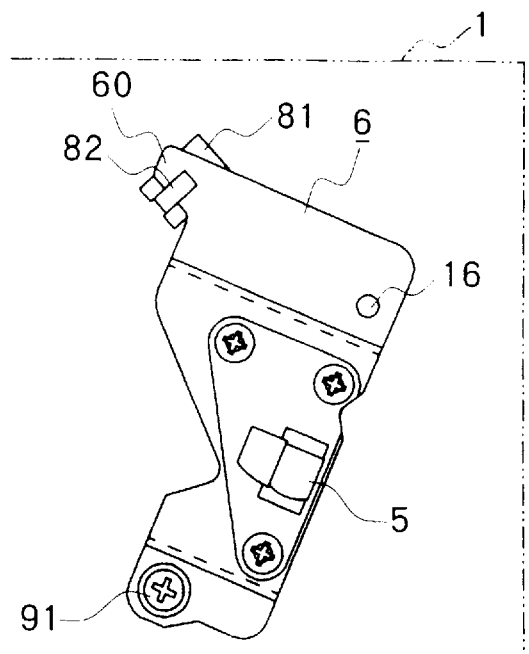
FIG. 8 is a plan view showing a mechanism for adjusting the position of the control head according to another embodiment.
Figure 9:
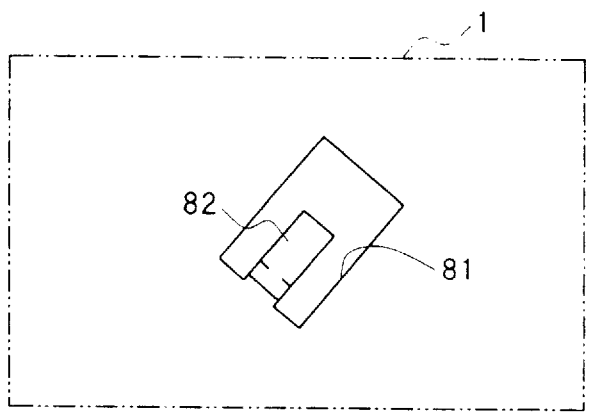
FIG. 9 is an enlarged plan view showing a raised piece for use in the embodiment.
Figure 10:
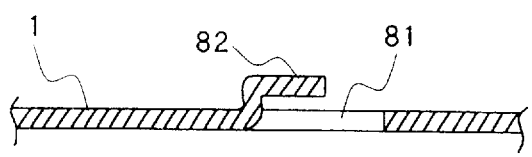
FIG. 10 is a sectional view of the raised piece.
Figure 11:
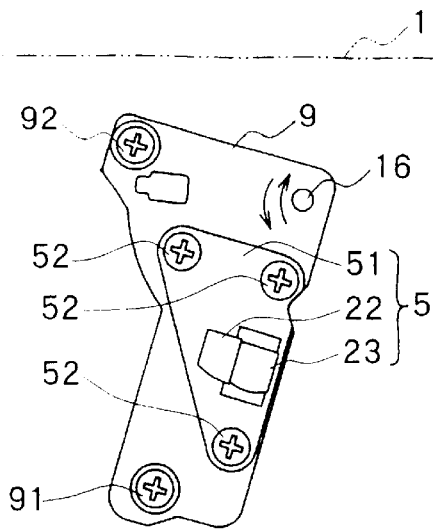
FIG. 11 is a plan view showing a conventional mechanism for adjusting the position of the control head.
Figure 12:
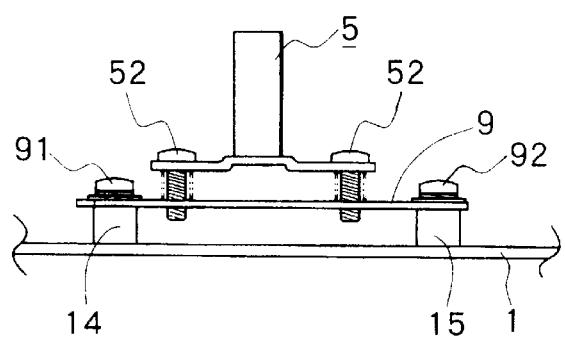
FIG. 12 is a side elevation of the position adjusting mechanism.
Figure 13:
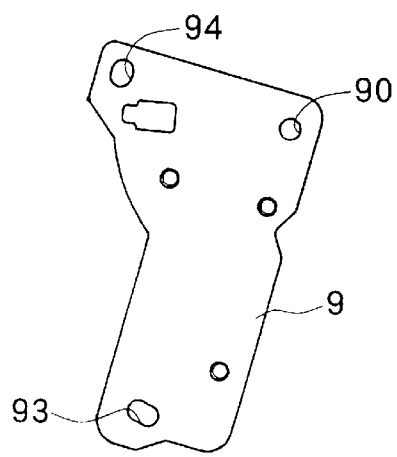
FIG. 13 is a side elevation of a support table used for the position adjusting mechanism.

The device of the invention is not limited to the foregoing embodiment in construction but can be modified variously by one skilled in the art without departing from the spirit of the invention as set forth in the appended claims. For example, the clamping mechanism for holding the portion 60 of the support plate 6 need not be limited to the clamp piece 7 of resin attached to the chassis 1 as described above, but can alternatively be molded integrally with the chassis 1. For example as shown in FIGS. 8 to 10, a hooklike raised piece 82 can be formed on the chassis 1 by forming a cutout 81 therein. As seen in FIG. 8, the portion 60 of the support plate 6 is held between and clamped by the surface of the chassis 1 and the raised piece 82. The clamping mechanism thus provided of course has the same advantage as described above.

What is claimed is:

1. A video tape recorder wherein a magnetic tape is caused to extend along a specified path of travel to move past a rotary cylinder head and a control head for recording signals on the tape or reproducing signals therefrom, the video tape recorder being characterized in that the control head is supported by a position adjusting mechanism on a chassis 1, the distance the tape travels from the head cylinder to the control head being adjustable by the position adjusting mechanism, the position adjusting mechanism comprising:

a support plate 6 having the control head mounted thereon, a pivotal support mechanism pivotally supporting a first end of the support plate 6 on the chassis 1 so as to move the control head toward or away from the head cylinder, a clamp mechanism holding a second end of the support plate 6 on the chassis 1 by clamping to give resistance to the pivotal movement of the support plate 6 about the pivotal support mechanism, and a fastening mechanism engaging a third end of the support plate 6 with play for permitting the movement of the support plate 6 about the pivotal support mechanism and fixing the third end to the chassis 1 at an optional position within the range of the play to prevent the movement of the support plate 6, wherein the clamp mechanism comprises a resin clamp piece 7 secured to the chassis 1, and the clamp piece 7 comprises a receiving portion 71 for receiving a rear surface of the second end of the support plate 6 and a holding portion 72 for holding a front surface of the second end of the support plate 6 under pressure, the second end of the support plate 6 being inserted between the receiving portion 71 and the holding portion 72 by a press fit.

2. A video tape recorder wherein a magnetic tape is caused to extend along a specified path of travel to move past a rotary cylinder head and a control head for recording signals on the tape or reproducing signals therefrom, the video tape recorder being characterized in that the control head is supported by a position adjusting mechanism on a chassis 1, the distance the tape travels from the head cylinder to the control head being adjustable by the position adjusting mechanism, the position adjusting mechanism comprising:

a support plate 6 having the control head mounted thereon, a pivotal support mechanism pivotally supporting a first end of the support plate 6 on the chassis 1 so as to move the control head toward or away from the head cylinder, a clamp mechanism holding a second end of the support plate 6 on the chassis 1 by clamping to give resistance to the pivotal movement of the support plate 6 about the pivotal support mechanism, and a fastening mechanism engaging a third end of the support plate 6 with play for permitting the movement of the support plate 6 about the pivotal support mechanism and fixing the third end to the chassis 1 at an optional position within the range of the play to prevent the movement of the support plate 6, wherein the clamp mechanism is formed integrally with the chassis 1 and has a raised piece 82 holding with pressure a front surface of the second end of the support plate 6 received by a front surface of the chassis 1, and the second end of the support plate 6 is inserted between said front surface of the chassis 1 and the raised piece 82 by a press fit.

3. A video tape recorder wherein a magnetic tape is caused to extend along a specified path of travel to move past a rotary cylinder head and a control head for recording signals on the tape or reproducing signals therefrom, the video tape recorder being characterized in that the control head is supported by a position adjusting mechanism on a chassis 1, the distance the tape travels from the head cylinder to the control head being adjustable by the position adjusting mechanism, the position adjusting mechanism comprising:

a support plate 6 having the control head mounted thereon, a pivotal support mechanism pivotally supporting a first end of the support plate 6 on the chassis 1 so as to move the control head toward or away from the head cylinder, a clamp mechanism holding a second end of the support plate 6 on the chassis 1 by clamping to give resistance to the pivotal movement of the support plate 6 about the pivotal support mechanism, and a fastening mechanism engaging a third end of the support plate 6 with play for permitting the movement of the support plate 6 about the pivotal support mechanism and fixing the third end to the chassis 1 at an optional position within the range of the play to prevent the movement of the support plate 6, wherein the fastening mechanism comprises a screw 91 extending through an elongated hole 62 formed in the support plate 6 and screwed in a boss 14 on the chassis 1, and the support plate 6 is pivotally movable about the pivotal support mechanism within a range allowed by the elongated hole 62.

* * * * *